June 12, 1951  J. B. WALKER  2,556,307
DEVICE FOR INCREASING ILLUMINATION OF PHOTOGRAPHIC IMAGES
Filed May 15, 1948

INVENTOR.
JOSEPH B. WALKER
BY
*Westall & Westall*
ATTORNEYS

Patented June 12, 1951

2,556,307

UNITED STATES PATENT OFFICE 2,556,307

DEVICE FOR INCREASING ILLUMINATION OF PHOTOGRAPHIC IMAGES

Joseph B. Walker, Hollywood, Calif.

Application May 15, 1948, Serial No. 27,199

1 Claim. (Cl. 95—1)

This invention relates generally to camera attachments, and contemplates more specifically a device for uniformly brightening or increasing the illumination of a photographic image registered upon the film during exposure within the camera.

While the intensity of the light reflected directly from a photographic subject to the film normally determines the delineation attainable in the image as registered by the film, the contrast between the highly illuminated elements of the subject appears to be exaggerated, while the darker elements of the image are unduly subdued. This is due in a large measure to the inability of the eye of an observer to distinguish between the different gradations of darker shadows imposed upon the film. It is accordingly desirable to uniformly increase the illumination of the entire image, whereby differences in the light intensity of different shadow portions of the image may be more readily distinguished, without material loss of definition.

It is a general object of the present invention to provide a device for combinative utility with conventional motion picture or still cameras by which a soft diffused glow of white or colored light may be directed to and impressed upon the film during exposure to uniformly raise the light value of the recorded image, and thereby either increase the low light values to an intensity capable of being more easily distinguished by the observer, or reduce the exposure time required.

Another and highly important object is to provide means for transmitting to the film through the lens system of a camera a colored or filter-modified light coincident with exposure to variously effect the brightness of the image or the tinting of a colored image recorded upon the film.

Another object is to provide a light source in combination with means for directing the light to the film for the purposes above indicated, wherein the intensity and color of the light beam directed to the film may be varied so as to produce different pictorial effects upon successive exposures.

More specifically it is an object hereof to provide a camera attachment comprising a light box containing a lamp adapted to be mounted in a position forward and laterally of the camera in combination with a transmission mirror axially coincident with the optical system to transmit light from the subject to be photographed and reflect light emanating from the lamp to the film, the light reflected by the transmission mirror being variable in response to a manual control.

Other objects and important advantages of my invention include simplicity of construction, economy of manufacture, adaptability to cameras of various types, and the attainment of a material gain in film speed, will be apparent to those of skill in the art upon an examination of the following description read in the light of the accompanying drawings, in which.

Figure 1:
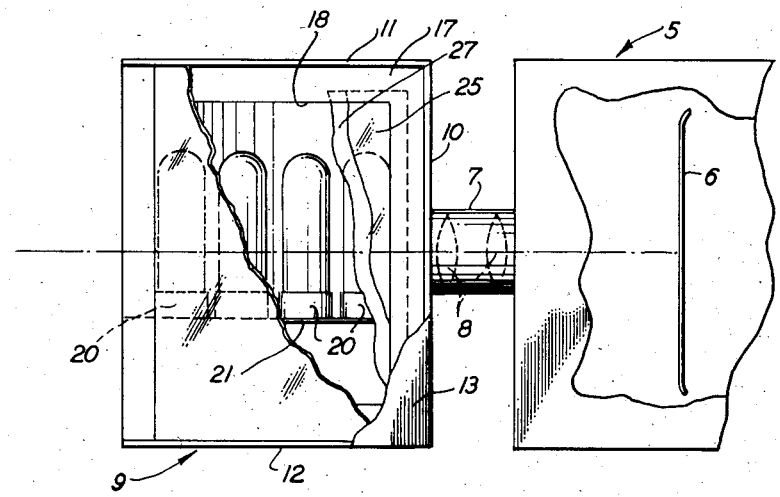
Fig. 1 is an elevation, partially broken away, of a camera attachment embodying my invention, illustrating its application to a conventional camera.
Figure 2:
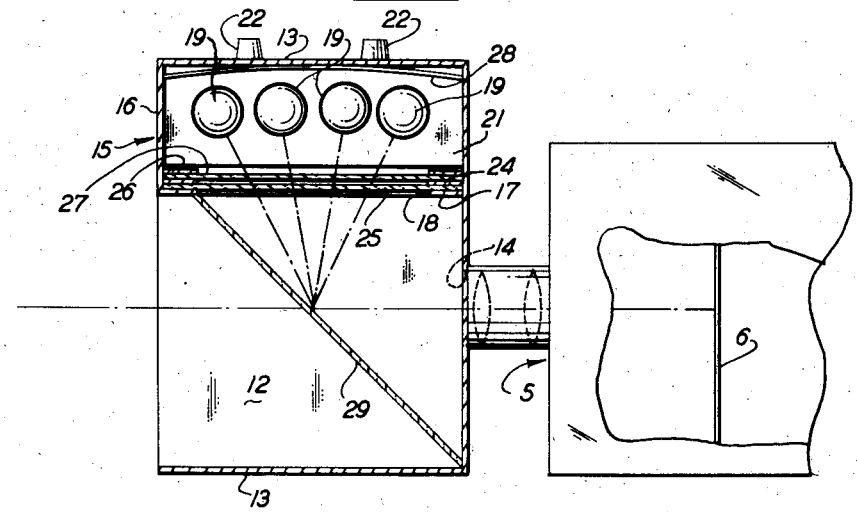
Fig. 2 is a horizontal sectional view of the device depicted in Fig. 1, with the camera broken away to illustrate the position of the film with respect to the auxiliary light source.
Figure 3:
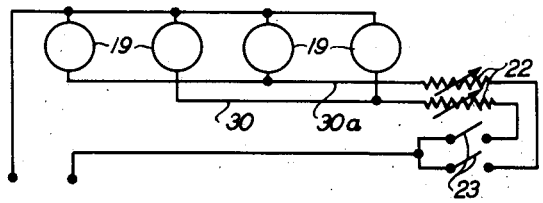
Fig. 3 is a circuit diagram of the illumination system.

Referring to the drawings in detail, the numerals of which indicate similar parts throughout the several views, 5 designates generally a camera in which film 6 is accommodated. It will be understood that as the photographic attachment hereof is adapted for utility with any well-known type of camera, the details of camera 5, not forming any part of the invention, are not illustrated. Projecting from the forepart of the camera and forming an essential part thereof is a tubular lens mounting 7 in which are housed lenses 8—8 for projecting to the film an image of the photographic subject.

A box-like frame 9 comprising a back 10, top 11, bottom 12 and end walls 13 secured by suitable means (not shown) forward of the camera on the lens mounting 7 with the latter projecting through an opening 14 in the back 10. The forward side of the frame is open so as not to restrict the field of the camera. Laterally of the axis of the lens system 8—8 of the camera 5 is a lamp housing 15, the back of which is formed by one of the end walls 13 of the frame and is enclosed at the forepart of the frame 9 by a wall 16 which opposes the adjacent end of the back 10 of the frame. The side of the lamp housing 15 nearest adjacent the lens axis of the camera comprises a wall 17 having a large rectangular opening 18 therein through which light rays from a suitable source enclosed within the housing 15 are directed. The light source comprises four lamps 19 mounted in sockets 20 carried by a horizontal partition 21 secured to the walls 16 and 19 of the lamp housing 15. Two of the sockets 20 are arranged in parallel in a circuit 30 and the other two are similarly included in a circuit 30a. Each circuit is controlled by a conventional rheostat 22 and a switch 23 by which the power to the lamps 19 may be varied or the circuits completely broken. In the embodiment illustrated, the pairs of lamps of the respective circuits are of different colors whereby differently colored beams of light may be coincidently or separately produced in a manner and for a purpose hereinafter more fully described.

A pair of flat guide rails 24 are secured to the side 16 of the lamp housing and to the back 10 of the frame 9, respectively, in a common plane parallel to but spaced from the inner surface of the wall 17. Thus the wall 17 and guide rails 24 are adapted to engage the marginal edges of a glass panel 25 so as to sustain the panel in normally vertical position across the opening 18 in the wall 17. A second pair of vertical rails 26 are secured to the wall 16 and back wall 10, respectively, in a plane spaced from the rails 24 at corresponding sides of the housing 15 so as to slidably accommodate the opposed vertical marginal edges of a filter 27 between the rails 24 and 26 at each side of the lamp housing.

The panel 25 is translucent, being formed with one surface thereof roughened to provide for the transmission of a uniformly diffused soft glow of light. It will be appreciated that the means for slidably mounting the panel 25 in the frame 9 permits the substitution of any of a plurality of glass panels varying in their degree of translucency. Correspondingly, the filter 27 is only illustrative of one of any number of light-modifying expedients which may be slid between the rails 24 and 26 upon removal of the filter. The light beam transmitted by the filter 27 and panel 25 is intensified by an arcuate reflector 28 interposed between the lamps 19 and the adjacent end wall 13 of the frame 9.

Within and extending diagonally across the frame from the forward corner of the lamp housing 15 to the opposite end of the back wall 10 through the lens axis of the camera is a transmission mirror 29 forming a 45° angle with the optical axis. The reflective surface of the mirror 29 is disposed to reflect the beam of light emanating from the lamp housing 15 and passing through the filter 27 and panel 25 to the lens system 8—8 of the camera and upon the film 6 within the latter, while coincidentally transmitting light reflected from the subject to be photographed to the film. While the particular transmission mirror 29 employed may vary in the proportion of its transmission and reflective values, it is preferred for most purposes that the mirror be relatively weak, i. e., of the order of ninety per cent transmission and ten per cent reflection.

The use and operation of the device is further briefly described as follows: Any suitable clamps or conventional supporting mechanism may be provided to mount the frame 9 upon the lens mounting 7 of the camera. The camera may then be employed in the usual manner. With a transmission mirror 29 of the type above indicated, installed within the frame 9, the light reflected from the subject to be photographed to the film will be reduced by approximately ten per cent. The closing of the circuits 30 and 30a through the lamps 19 is effective to transmit a diffused beam of light to the transmission mirror 29. While approximately ninety per cent of the light of the beam is transmitted by the mirror, the remaining ten per cent of that portion of the beam which is directed to the area of the mirror encompassed by the lens system 8—8 of the camera is reflected to the film 6. The intensity of the light may be varied in accordance with the specific results to be achieved by adjustment of the rheostats 22. In any event the value of the light reaching the film from the lamp housing 15 will be normally, though not necessarily, greater than that reflected from the photographic subject which is lost incident to the interposition of the mirror 29. The resultant loss in delineation in the image is more than offset by the uniform increase in illumination of the entire image by the auxiliary light beam, thus raising the light value of the shadowed details of the image and enabling the shadowed portions to be more easily discerned. Accordingly, even with a ten per cent loss in light reflected from the subject, a gain in film speed or a reduction in exposure time, without material loss of delineation, is achieved.

The choice and utility of a filter 27 for reducing or eliminating light of a certain color emanating from the lamps 19, or of adding color to the beam, depends upon the purposes to be accomplished. A color negative may be impressed with a tint of any desired color.

Coincident and corresponding adjustment of the rheostats 22 permits variation in the intensity of the light beam reflected to the film by the transmission mirror 29. Variable and relative adjustment of the rheostats 22 permits corresponding variation in the coloring of the superposed light directed to the film. Thus successively photographed stills or serially arranged motion pictures of the same scene may by reason of the consequent variation in the illumination of the successively recorded images, produce unusual pictorial effects.

While I have shown and described but one embodiment of my invention, it will be understood that numerous changes in size, design, shape and number of the various elements hereof may be made, and that the reflective value of the transmission mirror 29 may be reduced and the light-productive qualities of the lamp assembly increased so as to transmit a proportionately greater amount of light from the photographic subject while attaining maximum benefit of the auxiliary light beam, without departing from the spirit of my invention as defined in the appended claim.

What I claim and desire to secure by Letters Patent is:

In an attachment for a camera having a lens system, a box structure comprising a floor and a lamp housing, means for attachment of said box structure to the front of the camera with said lamp housing disposed laterally of the field of said lens system of the camera, a pair of differently colored lamps in said lamp housing, means in said lamp housing to direct a beam of light from said lamps across the field of said lens system, a transmission mirror extending across the field of said lens system in said beam to reflect light from said lamps into said camera through said lens system and coincidentally transmit light from the subject to be photographed through the lens system, separate means to energize said lamps, respectively, and means to vary the intensity of light emitted from said respective lamps in relation to one another.

JOSEPH B. WALKER.

(References on following page)

REFERENCES CITED

The following references are of record in the file of this patent:

UNITED STATES PATENTS

| Number | Name | Date |
|---|---|---|
| 999,115 | Le Beau | July 25, 1911 |
| 1,482,068 | Douglass | Jan. 28, 1924 |
| 1,482,070 | Douglass | Jan. 28, 1924 |
| 1,598,746 | Roes | Sept. 7, 1926 |
| 1,808,743 | Barkelew | June 9, 1931 |
| 2,352,914 | Rackett | July 4, 1944 |
| 2,388,842 | Hanson | Nov. 13, 1945 |

FOREIGN PATENTS

| Number | Country | Date |
|---|---|---|
| 327,741 | Great Britain | July 4, 1929 |